United States Patent
Suzuki et al.

(10) Patent No.: US 11,738,961 B2
(45) Date of Patent: Aug. 29, 2023

(54) SPLICE DEVICE, AND COMPOSITE MATERIAL AUTOMATED LAMINATION DEVICE

(71) Applicant: MITSUBISHI HEAVY INDUSTRIES, LTD., Tokyo (JP)

(72) Inventors: Akihito Suzuki, Tokyo (JP); Kazuki Ishida, Tokyo (JP); Kohei Muto, Tokyo (JP); Tsuyoshi Okawara, Tokyo (JP); Kenji Murakami, Tokyo (JP); Makoto Inomoto, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 152 days.

(21) Appl. No.: 17/429,468

(22) PCT Filed: Jan. 9, 2020

(86) PCT No.: PCT/JP2020/000445
§ 371 (c)(1),
(2) Date: Aug. 9, 2021

(87) PCT Pub. No.: WO2020/170639
PCT Pub. Date: Aug. 27, 2020

(65) Prior Publication Data
US 2022/0106144 A1    Apr. 7, 2022

(30) Foreign Application Priority Data
Feb. 20, 2019 (JP) ................. 2019-028188

(51) Int. Cl.
*B65H 19/18* (2006.01)
*B29C 70/38* (2006.01)
*B65H 19/20* (2006.01)

(52) U.S. Cl.
CPC ....... *B65H 19/1842* (2013.01); *B29C 70/388* (2013.01); *B65H 19/20* (2013.01); *B65H 2408/221* (2013.01)

(58) Field of Classification Search
CPC ............. B65H 19/1842; B65H 19/20; B65H 2408/221; B65H 2301/46022; B29C 70/388
See application file for complete search history.

(56) References Cited

U.S. PATENT DOCUMENTS

| 4,481,053 A | 11/1984 | Tokuno et al. |
| 2007/0044896 A1 | 3/2007 | Tingley |
| 2016/0243769 A1 | 8/2016 | Shibutani et al. |

FOREIGN PATENT DOCUMENTS

| JP | S58-059146 A | 4/1983 |
| JP | S62-146869 A | 6/1987 |

(Continued)

OTHER PUBLICATIONS

PCT/ISA/210, "International Search Report for International Application No. PCT/JP2020/000445," dated Mar. 24, 2020.

(Continued)

*Primary Examiner* — George R Koch
(74) *Attorney, Agent, or Firm* — Manabu Kanesaka; Benjamin Hauptman; Kenneth Berner

(57) ABSTRACT

The present invention includes a first weight scale that senses first information necessary when acquiring the residual amount of a first composite material sheet wound on a first support rod; a second weight scale that senses second information necessary when acquiring the residual amount of a second composite material sheet wound on a second support rod; a first cutting part for cutting the first composite material sheet; a second cutting part for cutting the second composite material sheet; a pressure-bonding mechanism that pressure-bonds the first composite material sheet and
(Continued)

the second composite material sheet; and a control device that controls the first cutting part, the second cutting part, and the pressure-bonding mechanism.

7 Claims, 10 Drawing Sheets

(56) References Cited

FOREIGN PATENT DOCUMENTS

| | | |
|---|---|---|
| JP | H06-206338 A | 7/1994 |
| JP | H07-040933 A | 2/1995 |
| JP | 2013-173574 A | 9/2013 |
| JP | 2015-089647 A | 5/2015 |
| JP | 2015-205735 A | 11/2015 |

OTHER PUBLICATIONS

PCT/ISA/237, "Written Opinion of the International Searching Authority for International Application No. PCT/JP2020/000445," dated Mar. 24, 2020.

SPLICE DEVICE, AND COMPOSITE MATERIAL AUTOMATED LAMINATION DEVICE

TECHNICAL FIELD

The present invention relates to a splice device and a composite material automated lamination device.

This application is a 371 of PCT/JP2020/000445, filing date Jan. 9, 2020.

Priority is claimed on Japanese Patent Application No. 2019-028188 filed on Feb. 20, 2019, the contents of which are incorporated herein by reference.

BACKGROUND ART

Composite material laminated members, in which composite material sheets are laminated, are used as skins of main wings and fuselage of an aircraft. When the composite material laminated member is formed, a composite material automated lamination device for automatically laminating composite material sheets is used. The composite material sheets are in the form of a roll wound around a support rod and is supplied to a place of use from this state.

PTL 1 discloses a technique of detecting that a composite material sheet wound around a support rod has disappeared with a sensor.

CITATION LIST

Patent Literature

[PTL 1] Specification of U.S. Unexamined Patent Application Publication No. 2007/0044896

SUMMARY OF INVENTION

Technical Problem

However, in PTL 1, the work of pressure-bonding a rear end portion of a composite material sheet in use and a tip portion of an unused composite material sheet wound around another support rod (hereinafter, "splice work") was complicated because it was necessary that a worker had to perform the work manually.

Thus, an object of the present invention is to provide a splice device and a composite material automated lamination device capable of automatically performing the splice work of pressure-bonding composite material sheets to each other.

Solution to Problem

In order to solve the above problems, a splice device according to an aspect of the present invention includes a first support rod around which a first composite material sheet is wound; a second support rod around which a second composite material sheet having the same configuration as that of the first composite material sheet is wound; a first detection unit that detects first information necessary for acquiring a residual amount of the first composite material sheet wound around the first support rod; a second detection unit that detects second information required for acquiring a residual amount of the second composite material sheet wound around the second support rod; a first cutting part that separates a rear end portion of the first composite material sheet from the first support rod by cutting the first composite material sheet in a width direction; a second cutting part that separates a rear end portion of the second composite material sheet from the second support rod by cutting the second composite material sheet in the width direction; a pressure-bonding mechanism that is disposed on a downstream side of the first and second cutting parts, pressure-bonds the rear end portion of the first composite material sheet and a tip portion of the second composite material sheet after the first composite material sheet is cut in the width direction, and pressure-bonds the rear end portion of the second composite material sheet and a tip portion of the first composite material sheet after the second composite material sheet is cut in the width direction; and a control device that controls the first cutting part, the second cutting part, and the pressure-bonding mechanism. The control device acquires the residual amount of the first composite material sheet on the basis of the first information, causes the first cutting part to cut the first composite material sheet when the residual amount of the first composite material sheet reaches a preset first residual amount, then causes the pressure-bonding mechanism to pressure-bond the rear end portion of the first composite material sheet and the tip portion of the second composite material sheet, acquires the residual amount of the second composite material sheet on the basis of the second information, causes the second cutting part to cut the second composite material sheet when the residual amount of the second composite material sheet reaches a preset second residual amount, and then causes the pressure-bonding mechanism to pressure-bond the rear end portion of the second composite material sheet and the tip portion of the first composite material sheet.

According to the present invention, by including the first detection unit, the first cutting part, the pressure-bonding mechanism, and the control device having the above configuration, when the first composite material sheet is used, the rear end portion of the first composite material sheet and the tip portion of the second composite material sheet can be automatically pressure-bonded after it is automatically detected that the residual amount of the first composite material sheet reaches the preset first residual amount and the first composite material sheet is automatically cut.

Additionally, by including the second detection unit, the second cutting part, the pressure-bonding mechanism, and the control device having the above configuration, when the second composite material sheet is used, the rear end portion of the second composite material sheet and the tip portion of the unused first composite material sheet can be automatically pressure-bonded after it is automatically detected that the residual amount of the second composite material sheet reaches the preset second residual amount and the second composite material sheet is automatically cut.

That is, the splice work of pressure-bonding the first composite material sheet and the second composite material sheet can be automatically performed whether the first composite material sheet is used or the second composite material sheet is used.

Additionally, in the splice device according to the aspect of the above present invention, the pressure-bonding mechanism may include a first suction plate including a first suction surface that suctions an inner surface of the rear end portion of the first composite material sheet or an inner surface of the tip portion of the first composite material sheet, a second suction plate including a second suction surface that suctions an inner surface of the tip portion of the second composite material sheet or an inner surface of the rear end portion of the second composite material sheet, and an elevating part that pressure-bonds the first composite material sheet and the second composite material sheet with the first and second suction plates in a state in which the first suction surface and the second suction surface are made to face each other by raising and lowering at least one of the first and second suction plates.

By having the first and second suction plates having such a configuration, it is possible to restrict the positions of pressure-bonded portions of the first and second composite material sheets. Accordingly, it is possible to suppress the positional deviation between the first composite material sheet and the second composite material sheet. Thus, the pressure-bonding between the first composite material sheet and the second composite material sheet can be accurately performed.

Additionally, in the splice device according to the aspect of the above present invention, the pressure-bonding mechanism may include a first heater unit that heats the first suction plate, and a second heater unit that heats the second suction plate.

By having the first and second heater units having such a configuration, it is possible to pressure-bond the first composite material sheet and the second composite material sheet in a heated state. Accordingly, the adhesion strength between the first composite material sheet and the second composite material sheet can be increased.

Additionally, in the splice device according to the aspect of the above present invention, the pressure-bonding mechanism may have a vibrating unit that vibrates at least one of the first suction plate and the second suction plate.

By having the vibrating unit having such a configuration, it is possible to pressure-bond the first composite material sheet and the second composite material sheet in a state in which at least one of the first and second composite material sheets is vibrated. Accordingly, the adhesion strength between the first composite material sheet and the second composite material sheet can be increased.

Additionally, in the splice device according to the aspect of the above present invention, the first detection unit may be a first weight scale that is disposed so as to support a portion of the first support rod located outside a region around which the first composite material sheet is wound from below and detects a first total weight of a remaining first composite material sheet wound around the first support rod and the first support rod as the first information, the second detection unit may be a second weight scale that is disposed so as to support a portion of the second support rod located outside a region around which the second composite material sheet is wound from below and detects a second total weight of a remaining second composite material sheet wound around the second support rod and the second support rod as the second information, and the control device may determine that the residual amount of the first composite material sheet reaches the first residual amount to cause the first cutting part to cut the first composite material sheet when the first total weight reaches a first predetermined weight input in advance to the control device, and determine that the residual amount of the second composite material sheet reaches the second residual amount to cause the second cutting part to cut the second composite material sheet when the second total weight reaches a second predetermined weight input in advance to the control device.

By having the first weight scale, the second weight scale, and the control device having such a configuration, it is possible to automatically determine whether or not the residual amounts of the first and second composite material sheets are low, and the first composite material sheet and the second composite material sheet can be automatically pressure-bonded.

Additionally, in the splice device according to the aspect of the above present invention, the first support rod and the second support rod may have a columnar shape, the first detection unit may be a first distance detection unit having a first detection surface that is disposed radially outside the first support rod so as to face an outer peripheral surface of the first composite material sheet wound around the first support rod and detecting a first distance from the first detection surface to the outer peripheral surface of the first composite material sheet as the first information on the basis of laser light emitted from the first detection surface toward the outer peripheral surface of the first composite material sheet, the second detection unit may be a second distance detection unit having a second detection surface that is disposed radially outside the second support rod so as to face an outer peripheral surface of the second composite material sheet wound around the second support rod and detecting a second distance from the second detection surface to the outer peripheral surface of the second composite material sheet as the second information on the basis of laser light emitted from the second detection surface toward the outer peripheral surface of the second composite material sheet, and the control device may determine that the residual amount of the first composite material sheet reaches the first residual amount to cause the first cutting part to cut the first composite material sheet when the first distance reaches a first predetermined distance input in advance to the control device, and determine that the residual amount of the second composite material sheet reaches the second residual amount to cause the second cutting part to cut the second composite material sheet when the second distance reaches a second predetermined distance input in advance to the control device.

By having the first distance detection unit, the second distance detection unit, and the control device having such a configuration, it is automatically determined whether or not the residual amounts of the first and second composite material sheets are low, and the first composite material sheet and the second composite material sheet can be automatically pressure-bonded.

Additionally, in the splice device according to the aspect of the above present invention, the first detection unit may be a first roller encoder that detects a first length by which the first composite material sheet wound around the first support rod is delivered, the second detection unit may be a second roller encoder that detects a second length by which the second composite material sheet wound around the second support rod is delivered, and the control device may determine that the residual amount of the first composite material sheet reaches the first residual amount to cause the first cutting part to cut the first composite material sheet when the first length detected by the first roller encoder reaches a first predetermined length input in advance to the control device, and determine that the residual amount of the second composite material sheet reaches the second residual amount to cause the second cutting part to cut the second prepreg sheet when the second length detected by the second roller encoder reaches a second predetermined length input in advance to the control device.

By having the first roller encoder, the second roller encoder, and the control device having such a configuration, it is possible to automatically determine whether or not the residual amounts of the first and second composite material sheets are low, and the first composite material sheet and the second composite material sheet can be automatically pressure-bonded.

In order to solve the above problems, a composite material automated lamination device according to one aspect of the present invention includes the above splice device; a lamination stage; a supply roller that feeds the first and second composite material sheets onto a composite material sheet disposed on an upper surface of the lamination stage or an upper surface of the lamination stage; a third cutting part that is provided on a downstream side of the supply roller and on an upstream side of the lamination stage and forms a composite material sheet piece by cutting the first composite material sheet or the second composite material sheet in the width direction; and a compaction roller that presses the composite material sheet piece.

According to the present invention, by including the above-described splice device, it is possible to automatically perform the splice work of pressure-bonding the composite material sheets to each other. Thus, the productivity of the composite material automated lamination device can be improved.

Advantageous Effects of Invention

According to the present invention, the splice work of pressure-bonding the composite material sheets to each other can be automatically performed.

DESCRIPTION OF EMBODIMENTS

Figure 1:
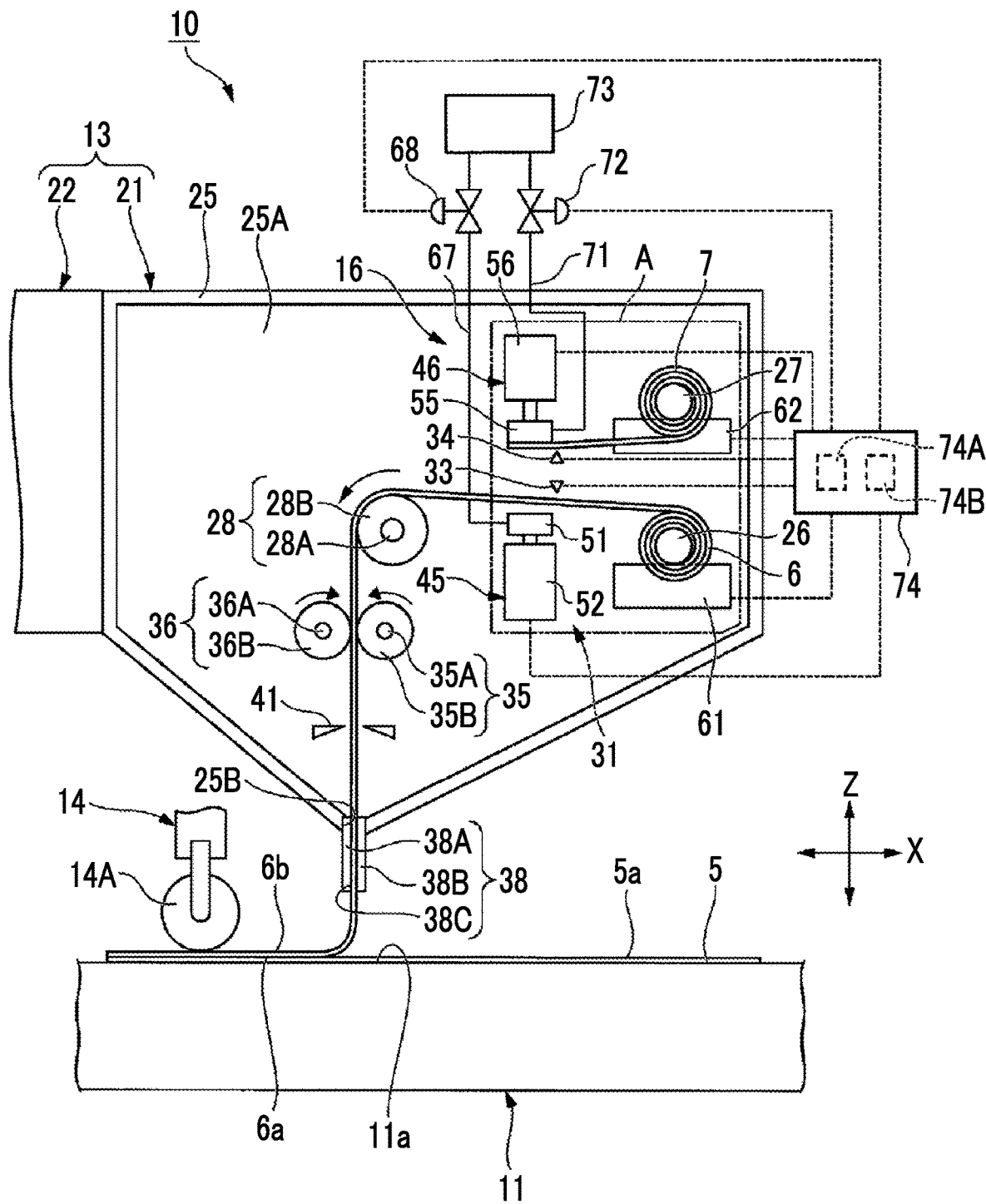
FIG. 1 is a side view illustrating a composite material automated lamination device according to a first embodiment of the present invention, and is a view schematically illustrating a state in which a first composite material sheet is being delivered.

Hereinafter, embodiments to which the present invention is applied will be described in detail with reference to the drawings.

First Embodiment

A composite material automated lamination device 10 of a first embodiment will be described with reference to FIGS. 1 to 6. In FIGS. 1 to 6, an X direction indicates the width direction of a lamination stage 11 illustrated in FIGS. 1 and 3 to 5 (a direction in which a compaction roller 14 moves), and a Z direction indicates the vertical direction orthogonal to the X direction. In FIGS. 1 and 3 to 5, as an example, a case where a first composite material sheet 6 is laminated on an upper surface 5a of a composite material sheet 5 disposed on an upper surface 11a of the lamination stage 11 is illustrated. In FIGS. 1 to 6, the same components as those of the structure illustrated in FIGS. 1 to 6 are designated by the same reference numerals.

The composite material automated lamination device 10 includes the lamination stage 11, a laminating robot 13, a compaction roller 14, and a splice device 16.

The lamination stage 11 has the upper surface 11a on which the composite material sheet 5 is placed. The upper surface 11a of the lamination stage 11 is a flat surface. As the composite material sheet 5, for example, a prepreg sheet can be used.

The laminating robot 13 has a composite material supply unit 21 and a robot arm 22.

The composite material supply unit 21 includes a housing 25, a first support rod 26, a second support rod 27, a support roller 28, a pressure-bonding mechanism 31, a first cutting part 33, a second cutting part 34, supply rollers 35 and 36, and a third cutting part 41.

The housing 25 is provided at a tip portion of the robot arm 22 and is supported by the robot arm 22. The housing 25 is a tubular member that extends to a back side of the paper surface. Both ends of the housing 25 are open ends in a direction in which the housing 25 extends.

The housing 25 has a shape in which the width thereof in the X direction is narrower from an upper end to a lower end of the housing 25. An accommodation space 25A is partitioned in the housing 25.

A groove portion 25B extending in the same direction as the housing 25 is formed at the lower end of the housing 25. The groove portion 25B communicates with the accommodation space 25A.

The housing 25 having the above configuration accommodates the first support rod 26, the second support rod 27, the support roller 28, the pressure-bonding mechanism 31, the first cutting part 33, the second cutting part 34, the supply rollers 35 and 36, and the third cutting part 41.

That is, the first support rod 26, the second support rod 27, the support roller 28, the pressure-bonding mechanism 31, the first cutting part 33, the second cutting part 34, the supply rollers 35 and 36, and the third cutting part 41 are disposed in the accommodation space 25A.

In addition, in the first embodiment, as an example, a case where both ends are open ends in the direction in which the housing 25 extends has been described. However, for example, doors that can be opened and closed may be provided at both ends of the housing 25.

The first support rod 26 is disposed on the side of the accommodation space 25A opposite to a side to which the robot arm 22 is connected. The first support rod 26 extends in the same direction as in the direction in which the housing 25 extends. The first support rod 26 has a columnar shape. The first composite material sheet 6 is wound around an outer peripheral surface of the first support rod 26. The first support rod 26 is supported by the housing 25 in a rotatable state. As the first composite material sheet 6, for example, a prepreg sheet can be used.

The diameter of the first composite material sheet 6 (rolled first composite material sheet 6) wound around the first support rod 26 decreases as the first composite material sheet 6 is unwound.

In addition, although not illustrated, the first support rod 26 is provided with a collar portion (not illustrated) for restricting the movement of the first composite material sheet 6 in the width direction.

The second support rod 27 is provided on the side of the accommodation space 25A opposite to the side to which the robot arm 22 is connected and above the first support rod 26. The second support rod 27 is disposed such that a central axis of the second support rod 27 and a central axis of the first support rod 26 are parallel to each other.

The second support rod 27 extends in the same direction as the direction in which the housing 25 extends. The second support rod 27 has a columnar shape. The second support rod 27 is supported by the housing 25 in a rotatable state.

A second composite material sheet 7 having the same configuration as the first composite material sheet 6 is wound around an outer peripheral surface of the second support rod 27. The term "same structure" as used herein means that the second composite material sheet 7 is made of the same material and has the same thickness and width as the first composite material sheet 6. As the second composite material sheet 7, for example, a prepreg sheet can be used.

In the state illustrated in FIG. 1, the second composite material sheet 7 is a spare composite material sheet to be used when a remaining first composite material sheet 6 is low.

In addition, although not illustrated, the second support rod 27 is provided with a collar portion (not illustrated) for restricting the movement of the second composite material sheet 7 in the width direction.

The support roller 28 is provided near the center of the accommodation space 25A. The support roller 28 is disposed closer to the robot arm 22 than the first and second support rods 26 and 27 in the X direction. The support roller 28 is disposed at a position higher than the first support rod 26 and lower than the second support rod 27 in the Z direction.

The support roller 28 has a shank 28A and a roller body 28B that extend in the same direction as the housing 25. The shank 28A supports the roller body 28B in a state in which the roller body 28B is rotatable. The shank 28A is supported by the housing 25 in a rotatable state.

The roller body 28B is a columnar roller that extends in the same direction as the housing 25. The roller body 28B pulls out the first composite material sheet 6 wound around the first support rod 26 in a direction from the first support rod 26 toward the support roller 28.

The pulled-out first composite material sheet 6 is in contact with a part of an outer peripheral surface of the roller body 28B.

The pressure-bonding mechanism 31 is disposed on the downstream side of the first and second cutting parts 33 and 34 and on the upstream side of the support roller 28 in the X direction.

The pressure-bonding mechanism 31 has a first pressure-bonding mechanism 45 and a second pressure-bonding mechanism 46.

The first pressure-bonding mechanism 45 is disposed below the first composite material sheet 6 located between the first cutting part 33 and the support roller 28. The first pressure-bonding mechanism 45 is supported by the housing 25.

The first pressure-bonding mechanism 45 has a first suction plate 51 and a first elevating part 52.

The first suction plate 51 is a plate-shaped member and has a first suction surface 51a, a plurality of suction holes 51A, and a suction path 51B.

The first suction surface 51a is a surface that comes into contact with an inner surface 6a of the first composite material sheet 6 and is a flat surface.

The plurality of suction holes 51A are formed in the first suction plate 51. One end of each of the plurality of suction holes 51A is exposed from the first suction surface 51a, and the other end thereof communicates with the suction path 51B.

The suction path 51B is formed on the first suction plate 51, and one end thereof is exposed from the first suction plate 51. One end of the suction path 51B is connected to a vacuum source 73 via a first line 67.

The first suction surface 51a of the first suction plate 51 having the above configuration is in a state of being separated downward from the first composite material sheet 6 in a state in which the first composite material sheet 6 is delivered. Additionally, when the first cutting part 33 cuts the first composite material sheet 6, the first suction plate 51 comes into contact with the inner surface 6a of the first composite material sheet 6 and suctions the inner surface 6a of the first composite material sheet 6.

The first elevating part 52 is disposed below the first suction plate 51 and is connected to a lower surface side of the first suction plate 51. The first elevating part 52 is configured to be capable of raising and lowering the first suction plate 51.

The first elevating part 52 pressure-bonds the first composite material sheet 6 and the second composite material sheet 7 with the first and second suction plates 51 and 55 in a state in which the first suction surface 51a and the second suction surface 55a are made to face each other by raising the first suction plate 51 when a rear end portion 6A (refer to FIG. 6) of the first composite material sheet 6 and a tip portion 7A of the second composite material sheet 7 are pressure-bonded.

The first elevating part 52 lowers the first suction plate 51 after the pressure-bonding of the first composite material sheet 6 and the second composite material sheet 7 is completed.

The second pressure-bonding mechanism 46 has a second suction plate 55 and a second elevating part 56.

The second suction plate 55 is a plate-shaped member and has a second suction surface 55a, a plurality of suction holes 55A, and a suction path 55B.

The second suction surface 55a is a surface that comes into contact with the inner surface 7a of the second composite material sheet 7, and is a flat surface.

The plurality of suction holes 55A are formed in the second suction plate 55. One end of each of the plurality of suction holes 55A is exposed from the second suction surface 55a, and the other end thereof communicates with the suction path 55B.

The suction path 55B is formed on the second suction plate 55, and one end thereof is exposed from the second suction plate 55. One end of the suction path 55B is connected to the vacuum source 73 via a second line 71.

The second suction surface 55a of the second suction plate 55 having the above configuration suctions the inner surface 7a of the tip portion 7A of the second composite material sheet 7 until the pressure-bonding between the rear end portion 6A of the first composite material sheet 6 and the tip portion 7A of the second composite material sheet 7 is completed.

Then, when the pressure-bonding between the rear end portion 6A of the first composite material sheet 6 and the tip portion 7A of the second composite material sheet 7 is completed, the suction of the second composite material sheet 7 by the second suction plate 55 is released and is brought into a state in which the delivery of the second composite material sheet 7 is possible.

By having the above-described first and second suction plates 51 and 55, it is possible to restrict the positions of pressure-bonded portions of the first and second composite material sheets 6 and 7. Accordingly, it is possible to suppress the positional deviation between the pressure-bonded portion of the first composite material sheet 6 and the pressure-bonded portion of the second composite material sheet 7. Thus, the pressure-bonding between the first composite material sheet 6 and the second composite material sheet 7 can be accurately performed.

The second elevating part 56 is disposed below the second suction plate 55 and is connected to a lower surface side of the second suction plate 55. The second elevating part 56 is configured to be capable of raising and lowering the second suction plate 55.

The second elevating part 56 pressure-bonds the first composite material sheet 6 and the second composite material sheet 7 in a state in which the first suction surface 51a and the second suction surface 55a are made to face each other by lowering the second suction plate 55 when the rear end portion of the second composite material sheet 7 and a tip portion of an unused first composite material sheet 6 are pressure-bonded.

The second elevating part 56 raises the second suction plate 55 after the pressure-bonding between the first composite material sheet 6 and the second composite material sheet 7 is completed.

The first cutting part 33 is provided on the upstream side of the first suction plate 51 and near the first suction plate 51. The first cutting part 33 is disposed so as to face an outer surface 6b of the first composite material sheet 6.

When the residual amount of the first composite material sheet 6 wound around the first support rod 26 is less than a preset first residual amount, the first cutting part 33 cuts the first composite material sheet 6 in the width direction.

The first cutting part 33 cuts the first composite material sheet 6 in the width direction to separate the rear end portion 6A of the first composite material sheet 6 from the first support rod 26. As the first cutting part 33, for example, a cutter can be used.

The second cutting part 34 is provided on the upstream side of the second suction plate 55 and near the second suction plate 55. The second cutting part 34 is disposed so as to face an outer surface 7b of the second composite material sheet 7.

The second cutting part 34 cuts the second composite material sheet 7 in the width direction when the second composite material sheet 7 is delivered and the residual amount of the second composite material sheet 7 wound around the second support rod 27 is less than a preset second residual amount.

The second cutting part 34 cuts the second composite material sheet 7 in the width direction to separate the rear end portion of the second composite material sheet 7 from the second support rod 27.

As the second cutting part 34, for example, a cutter can be used. In addition, as the first and second cutting parts 33 and 34, for example, an integrated cutter may be used.

The supply roller 35 is disposed below the support roller 28. The supply roller 35 has a shank 35A and a roller body 35B that extend in the same direction as the direction in which the housing 25 extends.

The shank 35A supports the roller body 35B in a state in which the roller body 35B is rotatable. The shank 35A is supported by the housing 25 in a rotatable state. The roller body 35B is a member having a columnar shape and has an outer peripheral surface that comes into contact with the first composite material sheet 6 or the second composite material sheet 7.

The supply roller 36 is disposed so as to face the supply roller 35 in the X direction. The supply roller 36 has a shank 36A and a roller body 36B that extend in the same direction as in the direction in which the housing 25 extends.

The shank 36A supports the roller body 36B in a state in which the roller body 36B is rotatable. The shank 36A is supported by the housing 25 in a rotatable state.

The roller body 36B is a member having a columnar shape. A gap into which the first composite material sheet 6 or the second composite material sheet 7 is insertable is formed between the roller body 36B and the roller body 35B.

The roller body 36B has an outer peripheral surface that comes into contact with the first composite material sheet 6 or the second composite material sheet 7.

As the supply rollers 35 and 36 having the above configuration are rotated in the direction of an arrow illustrated in FIG. 1 by a roller drive unit (not illustrated), the first composite material sheet 6 or the second composite material sheet 7 (in the case of FIG. 1, as an example, the first composite material sheet 6) is pulled out, and the first composite material sheet 6 or the second composite material sheet 7 is supplied to a guide unit 38.

The guide unit 38 has a first plate portion 38A, a second plate portion 38B, and a groove 38C.

The first and second plate portions 38A and 38B are provided in the groove portion 25B of the housing 25 so as to face each other in the X direction.

The groove 38C is formed between the first plate portion 38A and the second plate portion 38B. The groove 38C extends in the same direction as the direction in which the housing 25 extends.

Both ends of the groove 38C in the extending direction are open ends. The width of the groove 38C in the X direction is set to a size that allows the first composite material sheet 6 and the second composite material sheet 7 to pass through the groove 38C.

The guide unit 38 having the above configuration guides the first composite material sheet 6 or the second composite material sheet 7 to above the lamination stage 11. As an example, in the case of FIG. 1, the guide unit 38 guides the first composite material sheet 6 to the upper surface 5a of the composite material sheet 5.

The third cutting part 41 is provided between the supply rollers 35 and 36 and the guide unit 38 in the Z direction.

The third cutting part 41 is disposed so as to sandwich the first composite material sheet 6 or the second composite material sheet 7 (in the case of FIG. 1, the first composite material sheet 6). The third cutting part 41 cuts the first composite material sheet 6 or the second composite material sheet 7 in the width direction to form a composite material sheet piece. As the third cutting part 41, for example, a cutter can be used.

The robot arm 22 is an arm for moving the composite material supply unit 21 in the X direction and the Z direction.

The compaction roller 14 is provided outside the laminating robot 13. The compaction roller 14 extends in the same direction as the direction in which the housing 25 extends, and has a rotatable roller body 14A.

When the first composite material sheet 6 or the second composite material sheet 7 (composite material sheet piece) is laminated, the roller body 21A moves while rolling in a state in which the roller body 21A abuts against the outer surface 6b of the first composite material sheet 6 or the outer surface 7b of the second composite material sheet 7, so that a predetermined pressure is applied to the first composite material sheet 6 or the second composite material sheet 7 (composite material sheet piece) and thereby pressure-bonded to a lower structure.

In addition, the composite material automated lamination device 10 has a roller control device (not illustrated) that controls the position of the compaction roller 14, a load applied to the roller body 21A, and the like.

The splice device 16 includes the first support rod 26, the second support rod 27, the pressure-bonding mechanism 31, a first weight scale 61 which is a first detection unit, a second weight scale 62, which is a second detection unit, the first line 67, a first electromagnetic valve 68, the second line 71, a second electromagnetic valve 72, a vacuum source 73, and a control device 74.

As described earlier, the first support rod 26, the second support rod 27, and the pressure-bonding mechanism 31, which constitute the splice device 16, constitute a part of the laminating robot 13.

The first weight scale 61 is disposed so as to support the portion of the first support rod 26 located outside a region where the first composite material sheet 6 is wound from below. The first weight scale 61 is fixed to the housing 25 in a state in which the first total weight of a remaining first composite material sheet 6 wound around the first support rod 26 and the first support rod 26 is detectable.

The first weight scale 61 detects the first total weight as first information that is required when the residual amount of the first composite material sheet 6 wound around the first support rod 26 is acquired. The first weight scale 61 is electrically connected to the control device 74.

The first weight scale 61 transmits information about the first total weight to the control device 74.

The second weight scale 62 is disposed so as to support the portion of the second support rod 27 located outside a region where the second composite material sheet 7 is wound from below. The second weight scale 62 is fixed to the housing 25 in a state in which the second total weight of a remaining second composite material sheet 7 wound around the second support rod 27 and the second support rod 27 is detectable.

The second weight scale 62 detects the second total weight as second information that is required when the residual amount of the second composite material sheet 7 wound around the second support rod 27 is acquired. The second weight scale 62 is electrically connected to the control device 74.

The second weight scale 62 transmits information about the second total weight to the control device 74.

The first line 67 has one end connected to the vacuum source 73 and the other end connected to one end of the suction path 51B.

The first electromagnetic valve 68 is provided on the first line 67. The opening and closing operation of the first electromagnetic valve 68 is controlled by the control device 74.

When the first electromagnetic valve 68 is opened in a state in which the first suction surface 51a and the inner surface 6a of the first composite material sheet 6 are in contact with each other, the first suction surface 51a suctions the inner surface 6a of the first composite material sheet 6.

Then, when the first electromagnetic valve 68 is closed, the suction of the inner surface 6a of the first composite material sheet 6 by the first suction surface 51a is released.

The second line 71 has one end connected to the vacuum source 73 and the other end connected to one end of the suction path 55B.

The second electromagnetic valve 72 is provided on the second line 71. The opening and closing operation of the second electromagnetic valve 72 is controlled by the control device 74.

When the second electromagnetic valve 72 is opened in a state in which the second suction surface 55a of the second suction plate 55 and the inner surface 7a of the second composite material sheet 7 are in contact with each other, the second suction surface 55a of the second suction plate 55 suctions the inner surface 7a of the second composite material sheet 7.

Then, when the second electromagnetic valve 72 is closed, the suction of the inner surface 7a of the second composite material sheet 7 by the second suction surface 55a is released.

The vacuum source 73 is provided outside the housing 25. The vacuum source 73 is a device for performing the suction of the first and second composite material sheets 6 and 7 by the first and second suction surfaces 51a and 55a.

The control device 74 are electrically connected to the roller drive unit (not illustrated) that drives the supply rollers 35 and 36, the first cutting part 33, the second cutting part 34, the third cutting part 41, the first elevating part 52, the second elevating part 56, the first weight scale 61, the second weight scale 62, the first electromagnetic valve 68, and the second electromagnetic valve 72.

The control device 74 controls the roller drive unit (not illustrated), the first cutting part 33, the second cutting part 34, the third cutting part 41, the first elevating part 52, the second elevating part 56, the first weight scale 61, the second weight scale 62, the first electromagnetic valve 68, and the second electromagnetic valve 72.

The control device 74 includes a storage unit 74A such as a hard disk and a determination control unit 74B such as a processor.

The storage unit 74A stores a first predetermined weight and a second predetermined weight that have been input in advance. The first predetermined weight is a reference weight for determining that the residual amount of the first composite material sheet 6 is low. The second predetermined weight is a reference weight for determining that the residual amount of the second composite material sheet 7 is low.

Information about the first total weight is transmitted from the first weight scale 61 to the determination control unit 74B. When the first total weight reaches the first predetermined weight stored in the storage unit 74A, the determination control unit 74B determines that the residual amount of the first composite material sheet 6 reaches the first residual amount (small residual amount).

Figure 3:
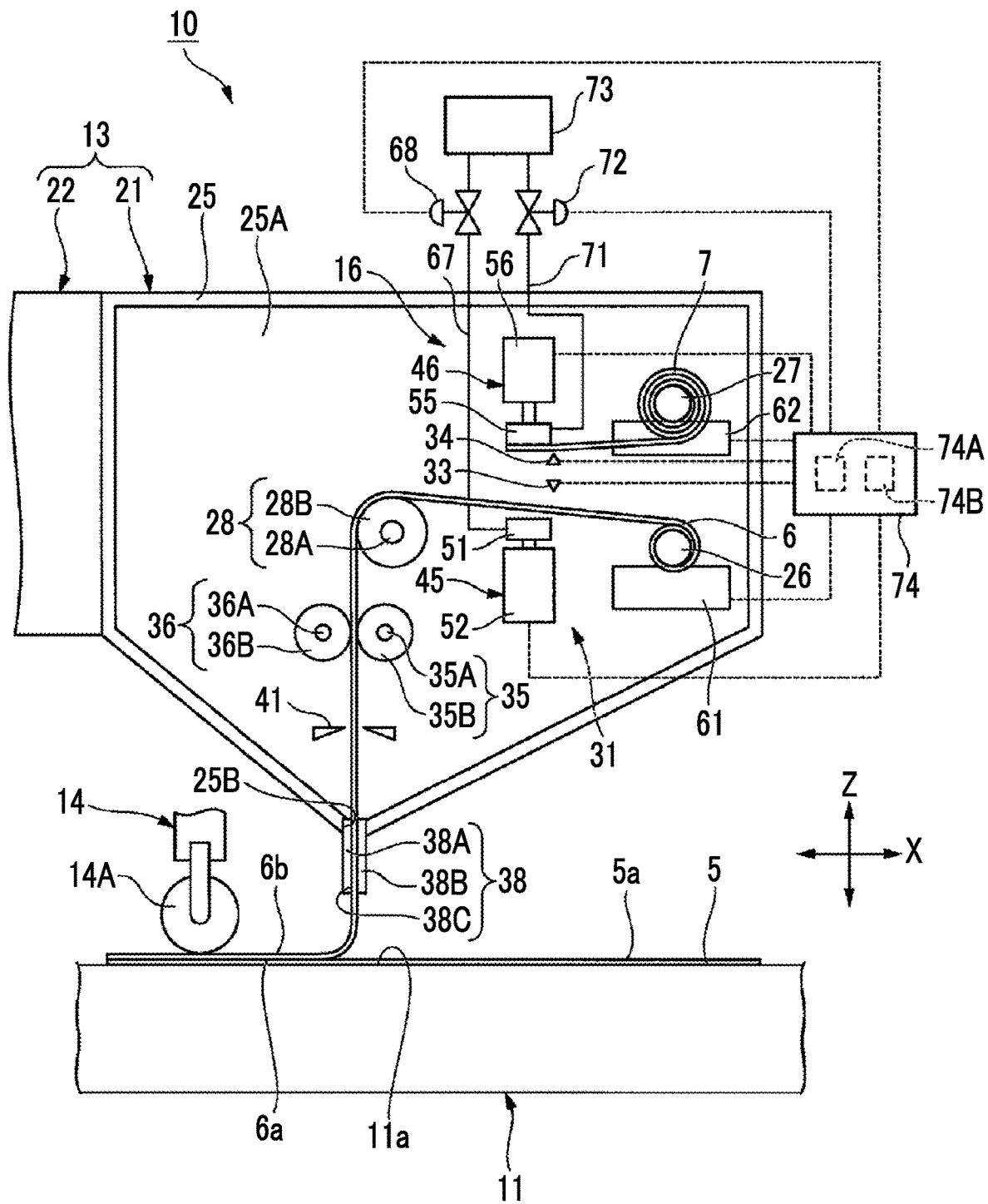
FIG. 3 is a side view illustrating the composite material automated lamination device according to the first embodiment of the present invention, and is a view schematically illustrating a state in which the delivery of the first composite material sheet is stopped.

After this determination, as illustrated in FIG. 3, the determination control unit 74B stops the rotation of the supply rollers 35 and 36 to stop the supply of the first composite material sheet 6.

Figure 4:
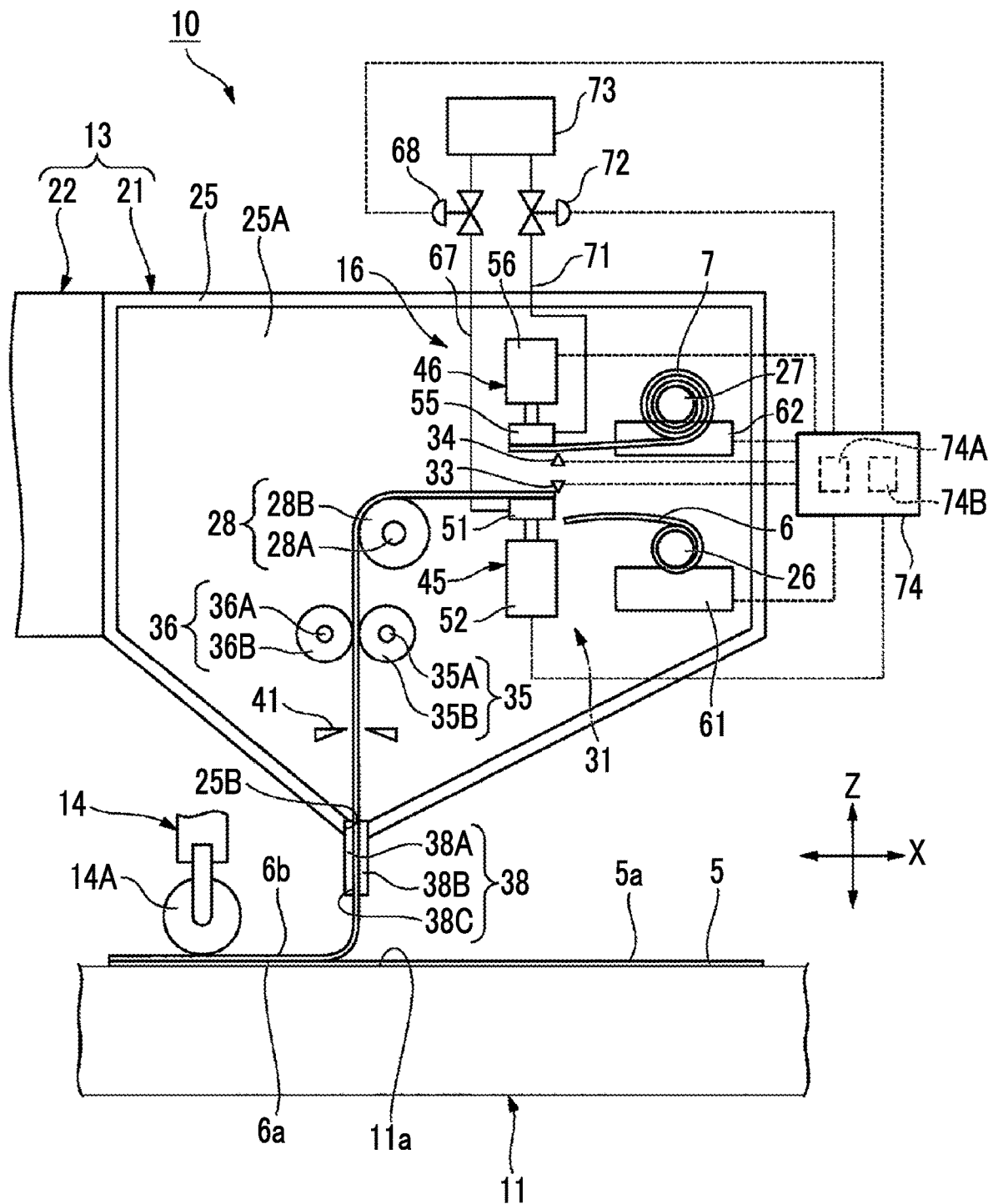
FIG. 4 is a side view illustrating the composite material automated lamination device according to the first embodiment of the present invention, and is a view schematically illustrating a state in which the first composite material sheet is cut.

Next, as illustrated in FIG. 4, the determination control unit 74B raises the first suction plate 51 by the first elevating part 52 to bring the first suction surface 51a into contact with the inner surface 6a of the first composite material sheet 6 and suction the inner surface 6a of the first composite material sheet 6 by the first suction surface 51a. After that, the determination control unit 74B controls the first cutting part 33 to cut the first composite material sheet 6.

Figure 5:
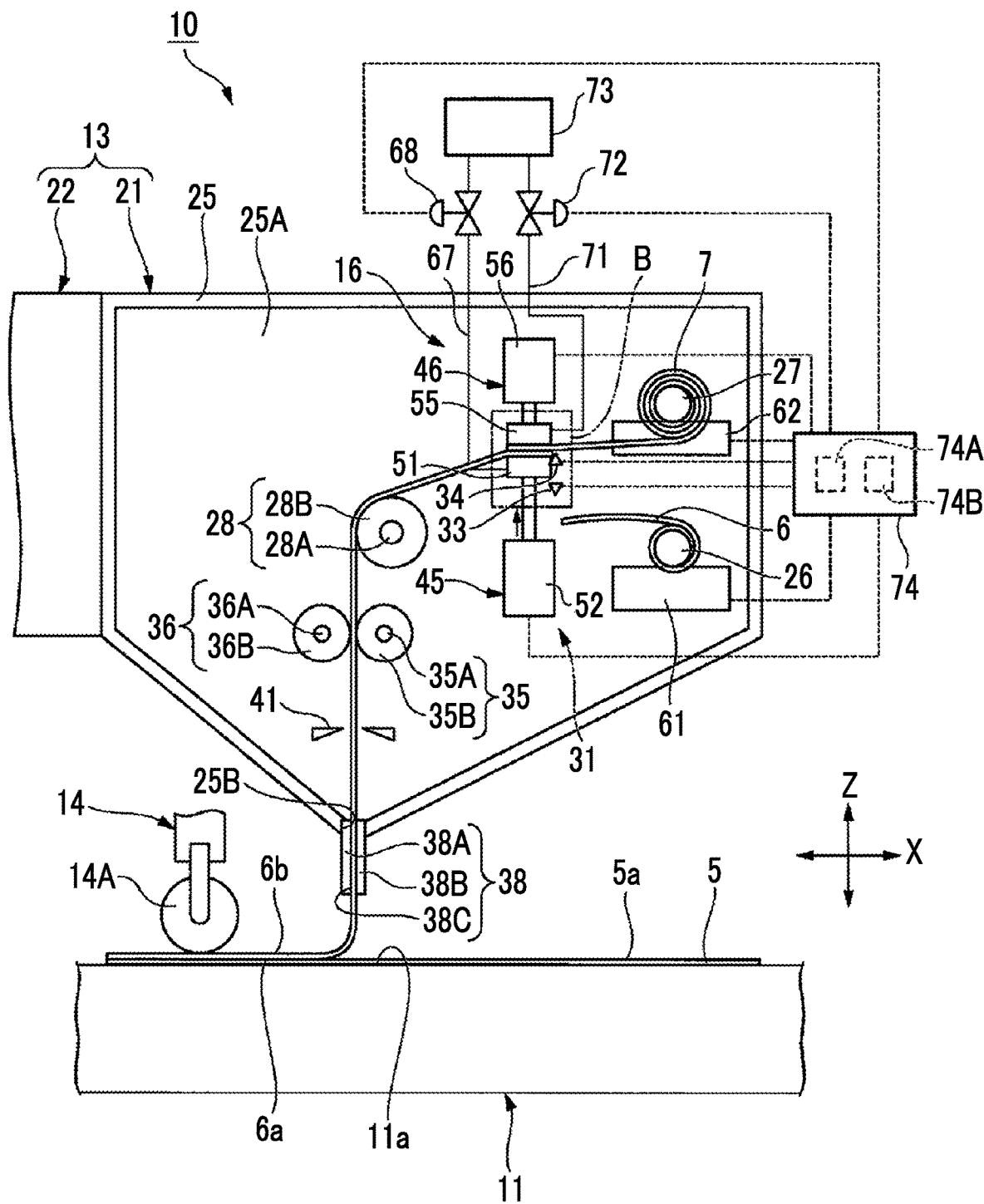
FIG. 5 is a side view illustrating the composite material automated lamination device according to the first embodiment of the present invention, and a view schematically showing a state in which the first composite material sheet and a second composite material sheet are pressure-bonded.
Figure 6:
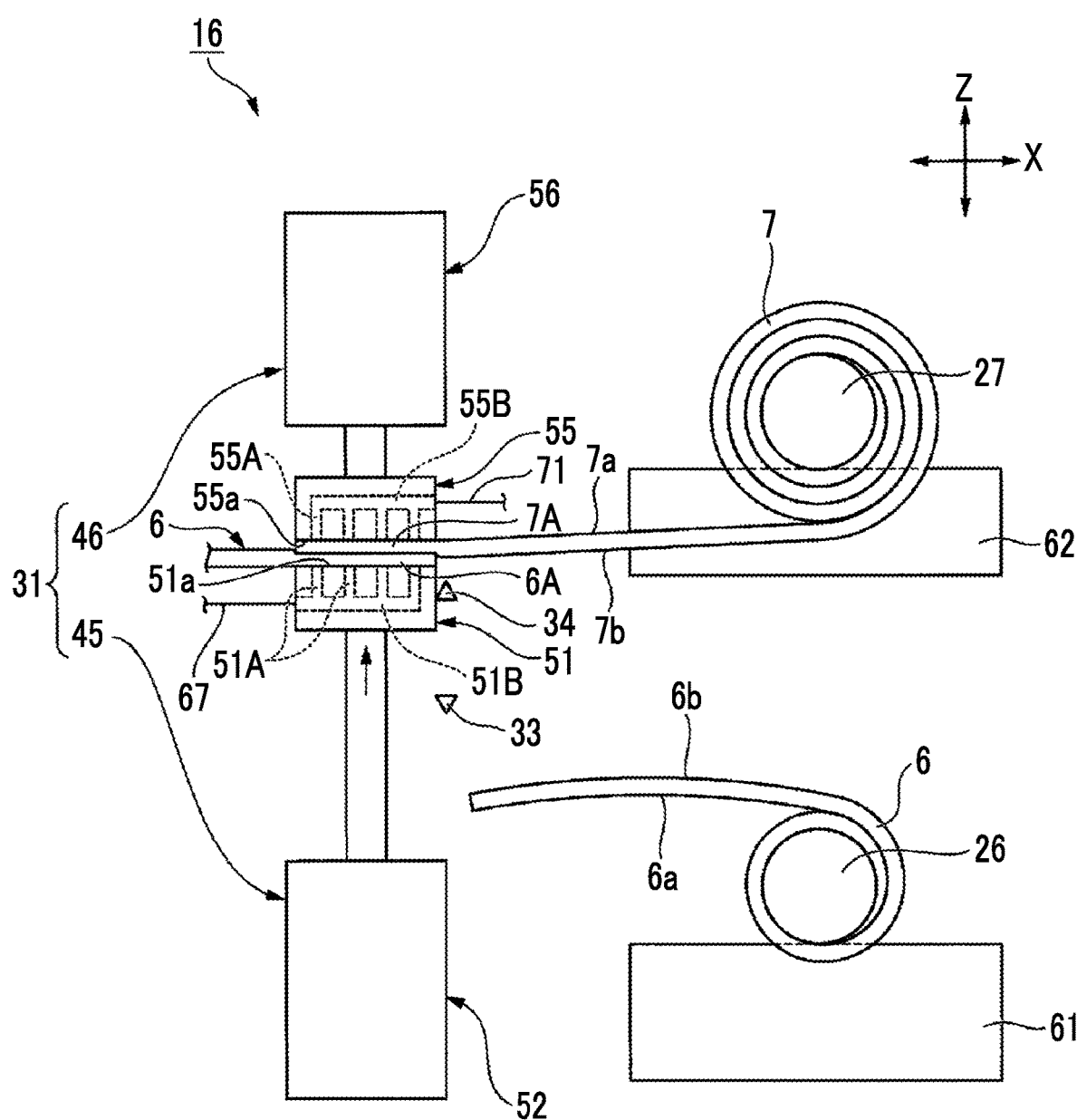
FIG. 6 is an enlarged view of a portion surrounded by the region A in the composite material automated lamination device illustrated in FIG. 5.

Next, as illustrated in FIGS. 5 and 6, the determination control unit 74B further raises the first suction plate 51 by the first elevating part 52 to pressure-bond the rear end portion 6A of the first composite material sheet 6 and the tip portion 7A of the second composite material sheet 7 in a state in which the first suction surface 51a and the second suction surface 55a face each other via the first and second composite material sheets 6 and 7.

After the pressure-bonding processing is completed, the determination control unit 74B lowers the first suction plate 51.

Additionally, the information about the second total weight is transmitted from the second weight scale 62 to the determination control unit 74B. When the second total weight reaches the second predetermined weight stored in the storage unit 74A, the determination control unit 74B determines that the residual amount of the second composite material sheet 7 reaches the second residual amount (small residual amount).

After this determination, the determination control unit 74B stops the rotation of the supply rollers 35 and 36 to stop the supply of the second composite material sheet 7. After that, the determination control unit 74B causes the second cutting part 34 to cut the second composite material sheet 7.

Next, the determination control unit 74B lowers the second suction plate 55 by the second elevating part 56 to pressure-bond the rear end portion of the second composite material sheet 7 and the tip portion of the unused first composite material sheet 6 in a state in which the first suction surface 51a and the second suction surface 55a face each other via the first and second composite material sheets 6 and 7.

After the pressure-bonding processing is completed, the determination control unit 74B raises the second suction plate 55.

According to the splice device 16 of the first embodiment, by including the first weight scale 61, the first cutting part 33, the pressure-bonding mechanism 31, and the control device 74 having the above configuration, when the first composite material sheet 6 is used, the rear end portion 6A of the first composite material sheet 6 and the tip portion 7A of the second composite material sheet 7 can be automatically pressure-bonded after it is automatically detected that the residual amount of the first composite material sheet 6 reaches the preset first residual amount and the first composite material sheet is automatically cut.

Additionally, by including the second weight scale 62, the second cutting part 34, the pressure-bonding mechanism 31, and the control device 74 having the above configuration, when the second composite material sheet 7 is used, the rear end portion of the second composite material sheet 7 and the tip portion of the unused first composite material sheet can be automatically pressure-bonded after it is automatically detected that the residual amount of the second composite material sheet 7 reaches the preset second residual amount and the second composite material sheet 7 is automatically cut.

That is, the splice work of pressure-bonding the first composite material sheet 6 and the second composite material sheet 7 (pressure-bonding the composite material sheets to each other) can be automatically performed.

Additionally, according to the composite material automated lamination device 10 of the first embodiment, by having the splice device 16, it is possible to automatically perform the splice work of pressure-bonding the composite material sheets to each other. Thus, the productivity of the composite material automated lamination device 10 can be improved.

In addition, the replacement work of the first composite material sheet 6 wound around the first support rod 26 and the replacement work of the second composite material sheet 7 wound around the second support rod 27 may be manually performed by a worker or may be automatically performed.

Second Embodiment

Figure 2:
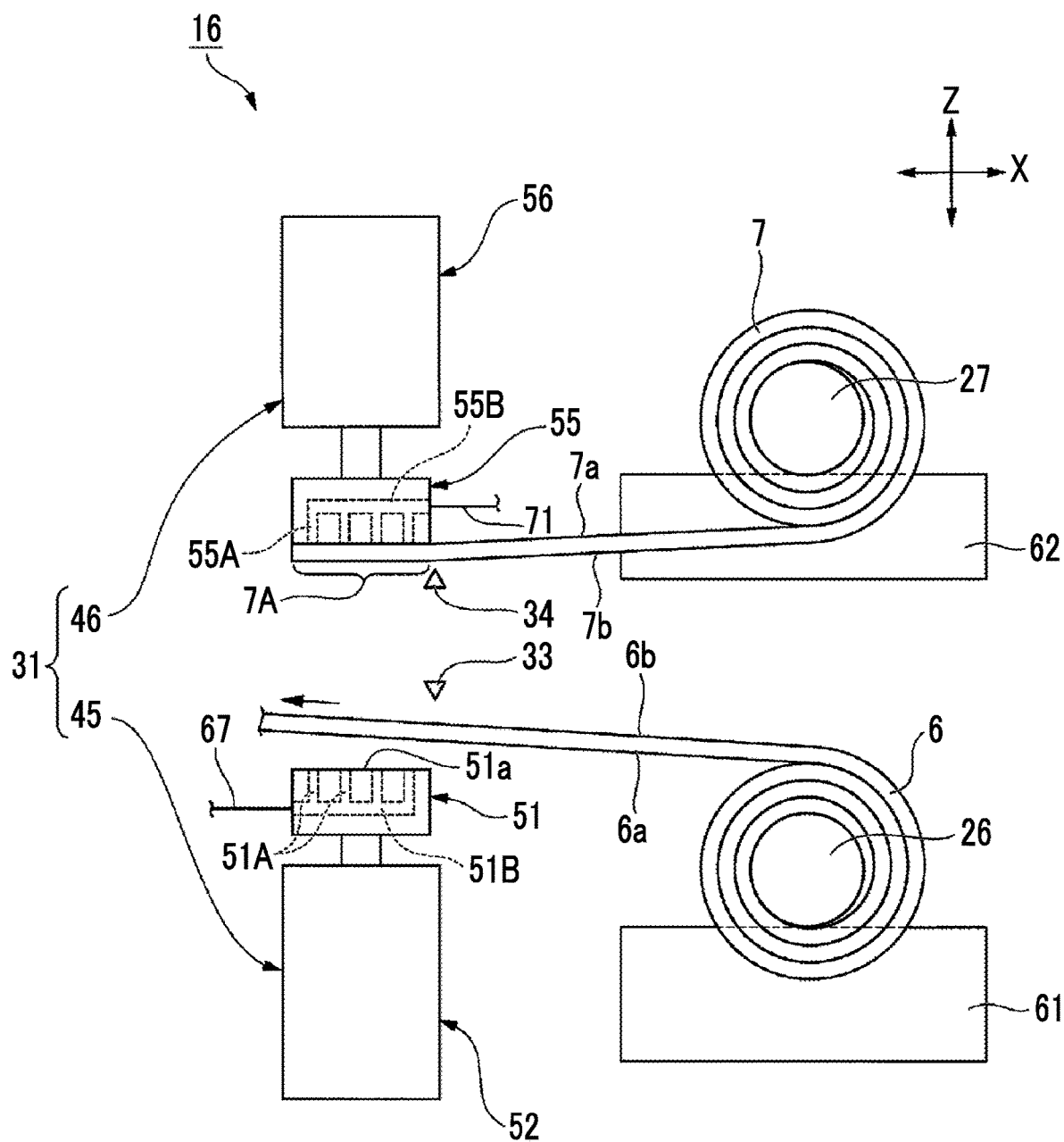
FIG. 2 is an enlarged view of a portion surrounded by a region A in the composite material automated lamination device illustrated in FIG. 1.
Figure 7:
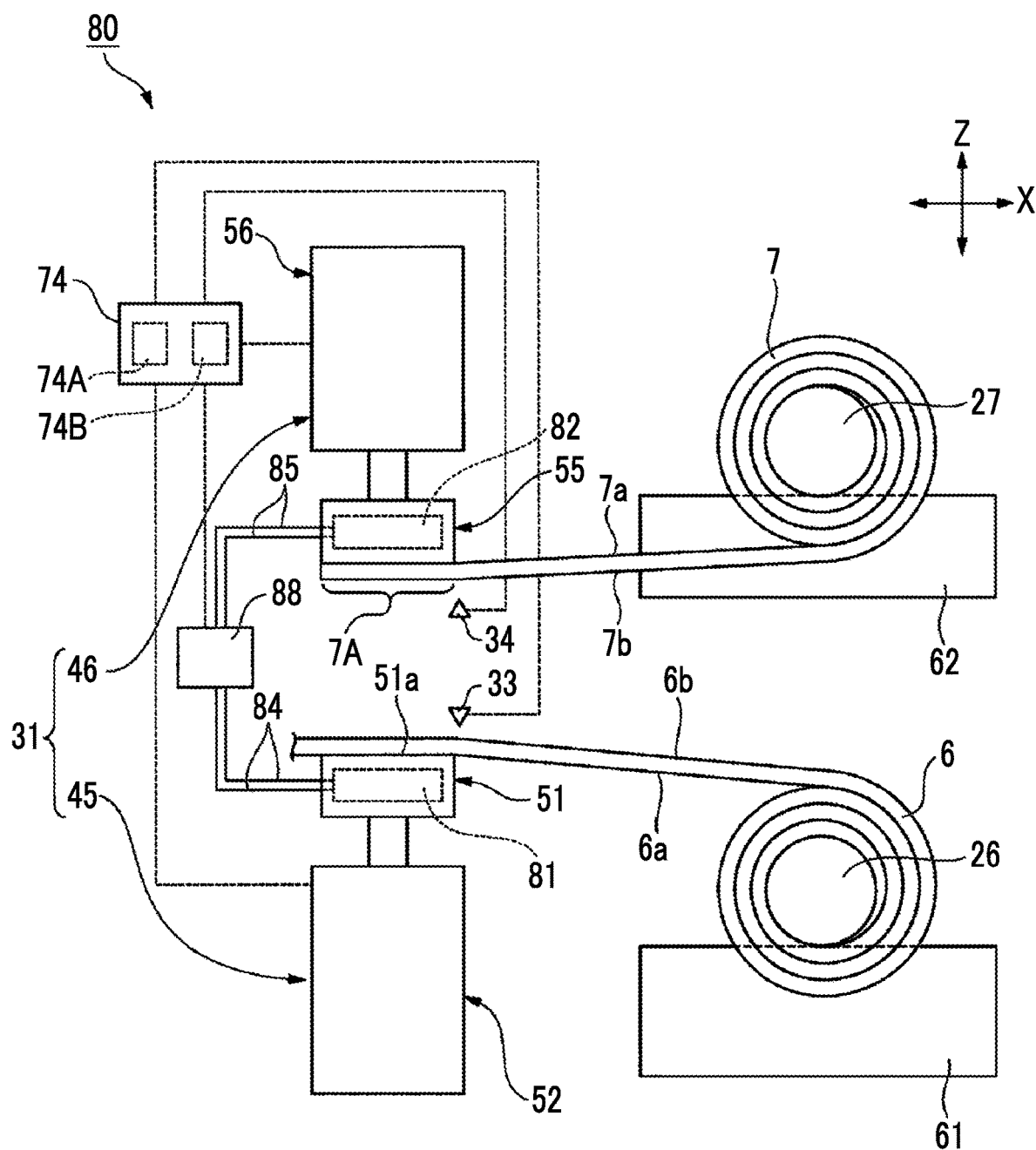
FIG. 7 is a side view illustrating principal parts of a splice device according to a second embodiment of the present invention.

A splice device 80 of the second embodiment will be described with reference to FIG. 7. In FIG. 7, the same components as those of the structure illustrated in FIGS. 1 to 6 are designated by the same reference numerals. In addition, in FIG. 7, the same components as those illustrated in FIG. 2 are designated by the same reference numerals.

The splice device 80 is configured similarly to the splice device 16 except for further including a first heater unit 81, a second heater unit 82, electric wires 84, 85, and a power supply 88 in addition to the configuration of the splice device 16 of the first embodiment.

The first heater unit 81 is internally provided in the first suction plate 51. The first heater unit 81 is connected to the power supply 88 via the electric wire 84. The first heater unit 81 heats the first composite material sheet 6 via the first suction plate 51 by heating the first suction plate 51.

The second heater unit 82 is internally provided in the second suction plate 55. The second heater unit 82 is connected to the power supply 88 via the electric wire 85. The second heater unit 82 heats the second composite material sheet 7 via the second suction plate 55 by heating the second suction plate 55.

The control device 74 is electrically connected to the power supply 88. The control device 74 controls the first and second heater units 81 and 82 via the power supply 88.

When the first composite material sheet 6 and the second composite material sheet 7 are pressure-bonded, the control device 74 supplies power to the first and second heater units 81 and 82.

According to the splice device 80 of the second embodiment, by having the above-described first and second heater units 81 and 82, it is possible to pressure-bond the first and second composite material sheets 6 and 7 in a heated state. Accordingly, the adhesion strength between the first composite material sheet 6 and the second composite material sheet 7 can be increased.

In addition, in the second embodiment, a case where the first and second heater units 81 and 82 are provided has been described as an example. However, one heater unit of the first and second heater units 81 and 82 may be provided.

Third Embodiment

Figure 8:
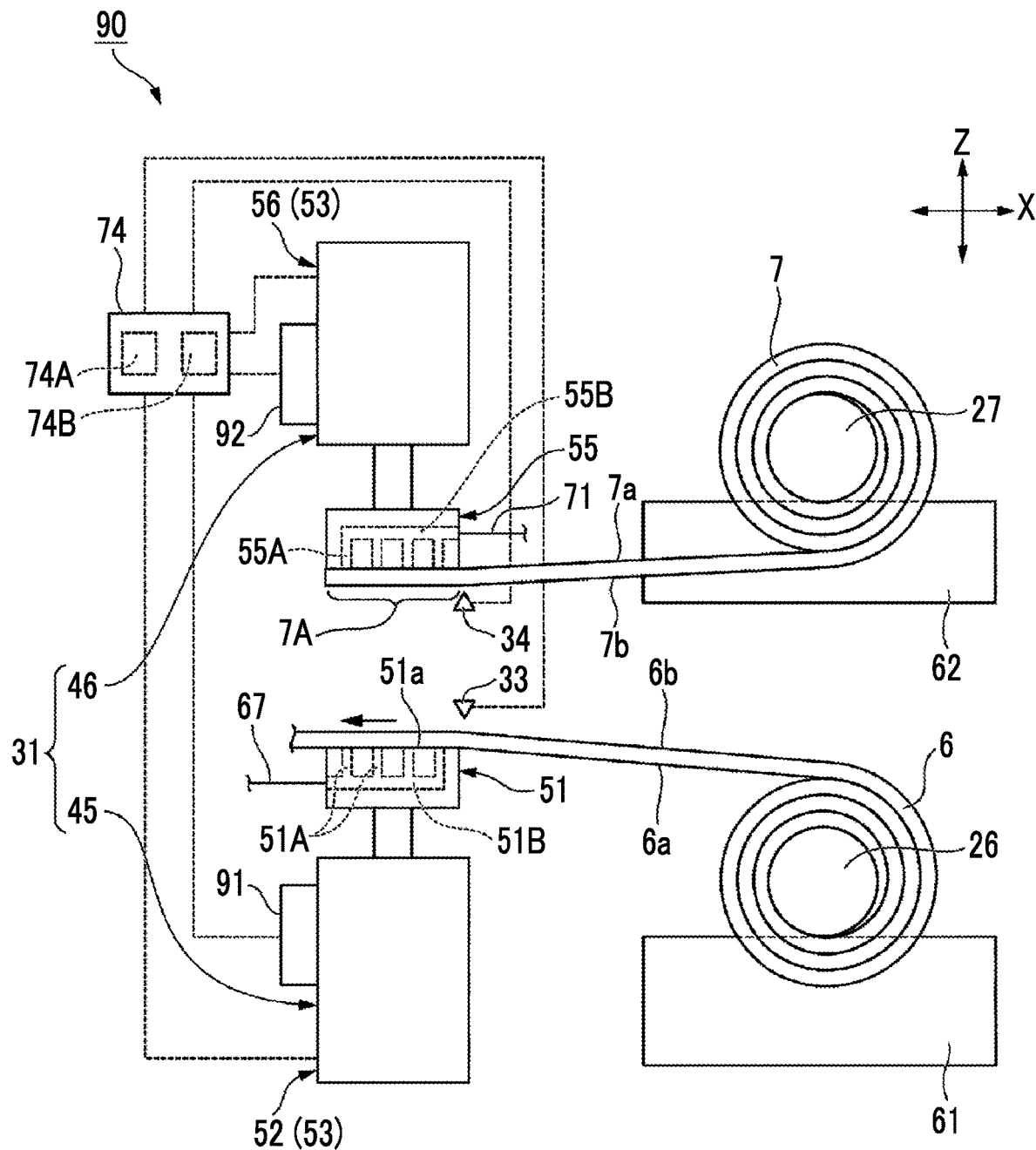
FIG. 8 is a side view illustrating principal parts of a splice device according to a third embodiment of the present invention.

The splice device 90 of the third embodiment will be described with reference to FIG. 8. In FIG. 8 the same components as those of the structure illustrated in FIGS. 1 to 6 are designated by the same reference numerals.

The splice device 90 is configured similarly to the splice device 16 except for having a first vibrating unit and a second vibrating unit 92 in addition to the configuration of the splice device 16 of the first embodiment.

The first vibrating unit 91 is provided in the first elevating part 52. The first vibrating unit 91 vibrates the first suction plate 51 with ultrasonic waves or the like via the first elevating part 52.

The second vibrating unit 92 is provided in the second elevating part 56. The second vibrating unit 92 vibrates the second suction plate 55 with ultrasonic waves or the like via the second elevating part 56.

The control device 74 is electrically connected to the first and second vibrating units 91 and 92. The control device 74 controls the drive of the first and second vibrating units 91 and 92.

When the first composite material sheet 6 and the second composite material sheet 7 are pressure-bonded to each other, the control device 74 uses the first and second vibrating units 91 and 92 to vibrate the first and second suction plates 51 and 55.

According to the splice device 90 of the third embodiment, by having the above-described first vibrating units 91 and 92, it is possible to pressure-bond the first and second suction plates 51 and 55 in a vibrated state. Accordingly, the adhesion strength between the first composite material sheet 6 and the second composite material sheet 7 can be increased.

In addition, in the second embodiment, a case where the first and second vibrating units 91 and 92 are provided has been described as an example. However, one vibrating unit of the first and second vibrating units 91 and 92 may be provided.

Additionally, the positions where the first and second vibrating units 91 and 92 are provided are not limited to the positions illustrated in FIG. 8. The first and second vibrating units 91 and 92 may be provided at positions where the first and second suction plates 51 and 55 can be vibrated.

Moreover, the first and second heater units 81 and 82 described in the second embodiment and the first and second vibrating units 91 and 92 described in the third embodiment may be used in combination.

Fourth Embodiment

Figure 9:
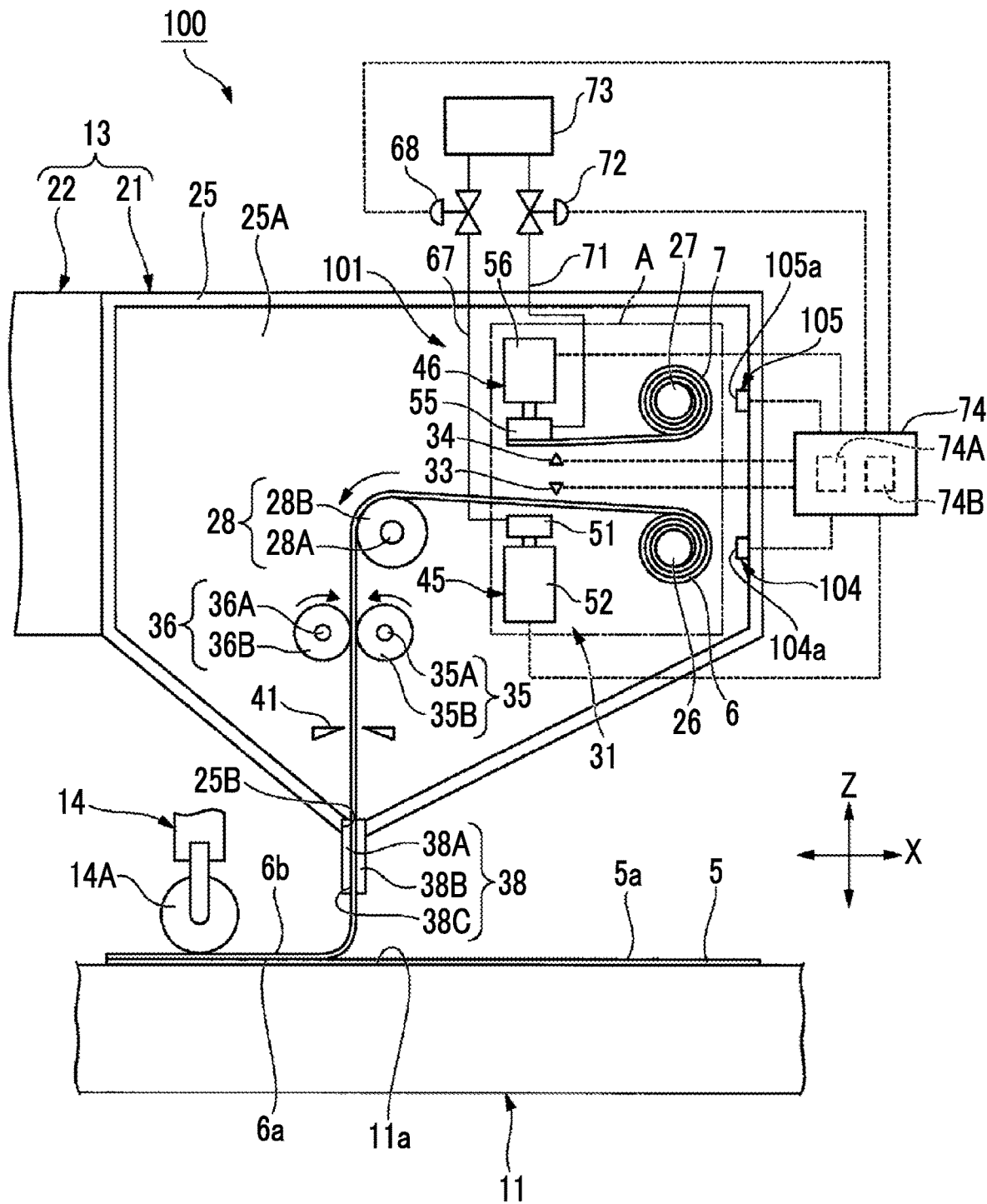
FIG. 9 is a side view illustrating a composite material automated lamination device according to a fourth embodiment of the present invention.

A composite material automated lamination device 100 of a fourth embodiment will be described with reference to FIG. 9. In FIG. 9, the same components as those of the structure illustrated in FIG. 1 are designated by the same reference numerals.

The composite material automated lamination device 100 is configured similarly to the composite material automated lamination device 10 except for having a splice device 101 instead of the splice device 16 constituting the composite material automated lamination device 10 of the first embodiment.

The splice device 101 configured similarly to a splice device 16 except for having a first distance detection unit 104 and a second distance detection unit 105 instead of the first and second weight scales 61 and 62 constituting the splice device 16.

The first distance detection unit 104 is provided on an inner wall of the housing 25 and is electrically connected to the control device 74.

The first distance detection unit 104 has a first detection surface 104a. The first distance detection unit 104 is disposed on radially outside the first support rod such that an outer peripheral surface of the first composite material sheet 6 wound around the first support rod 26 and the first detection surface 104a face each other in the X direction.

The first detection surface 104a includes, on the outer peripheral surface of the first composite material sheet 6, an irradiation surface irradiated with laser light, and a light receiving surface that receives the laser light reflected from the outer peripheral surface of the first composite material sheet 6.

The first distance detection unit 104 detects a first distance from the first detection surface 104a to the outer peripheral surface of the first composite material sheet 6 as first information on the basis of the laser light emitted from the first detection surface 104a toward the outer peripheral surface of the first composite material sheet 6. The first distance detection unit 104 transmits the information about the first distance to the control device 74.

The second distance detection unit 105 is provided on the inner wall of the housing 25 and is electrically connected to the control device 74.

The second distance detection unit 105 has a second detection surface 105a. The second distance detection unit 105 is disposed radially outside the second support rod 27 such that an outer peripheral surface of the second composite material sheet 7 wound around the second support rod 27 and the second detection surface 105a face each other in the X direction.

The second detection surface 105a includes, on the outer peripheral surface of the second composite material sheet 7, an irradiation surface irradiated with laser light, and a light receiving surface that receives the laser light reflected from the outer peripheral surface of the second composite material sheet 7.

The second distance detection unit 105 detects a second distance from the second detection surface 105a to the outer peripheral surface of the second composite material sheet 7 as second information on the basis of the laser light emitted from the second detection surface 105a toward the outer peripheral surface of the second composite material sheet 7. The second distance detection unit 105 transmits the information about the second distance to the control device 74.

The storage unit 74A of the control device 74 stores a first predetermined distance and a second predetermined distance that have been input in advance. The first predetermined distance is a reference distance for determining that the residual amount of the first composite material sheet 6 is low. The second predetermined distance is a reference distance for determining that the residual amount of the second composite material sheet 7 is low.

Information about the first distance is transmitted from the first distance detection unit 104 to the determination control unit 74B of the control device 74. When the first distance reaches the first predetermined distance stored in the storage unit 74A, the determination control unit 74B determines that the residual amount of the first composite material sheet 6 reaches the first residual amount (small residual amount). After that, the control device 74 performs the control for carrying out the processing described in the first embodiment (the supply and stop processing of the first composite material sheet 6, the cutting processing of the first composite material sheet 6, the pressure-bonding processing, and the like).

Additionally, the information about the second distance is transmitted from the second distance detection unit 105 to the determination control unit 74B of the control device 74. When the second distance reaches the second predetermined distance stored in the storage unit 74A, the determination control unit 74B determines that the residual amount of the second composite material sheet 7 reaches the second residual amount (small residual amount). After that, the control device 74 performs the control for carrying out the processing described in the first embodiment (the supply and stop processing of the second composite material sheet 7, the cutting processing of the second composite material sheet 7, the pressure-bonding processing, and the like).

According to the splice device 101 of the fourth embodiment, the first and second distance detection units 104 and 105 are provided instead of the first and second weight scales 61 and 62 described in the first embodiment. Accordingly, the splice work of pressure-bonding the composite material sheets (the first composite material sheet 6 and the second composite material sheet 7) can be automatically performed.

In addition, the first and second heater units 81 and 82 described in the second embodiment and the first and second vibrating units 91 and 92 described in the third embodiment may be appropriately combined and used for the splice device 101 of the fourth embodiment.

Fifth Embodiment

Figure 10:
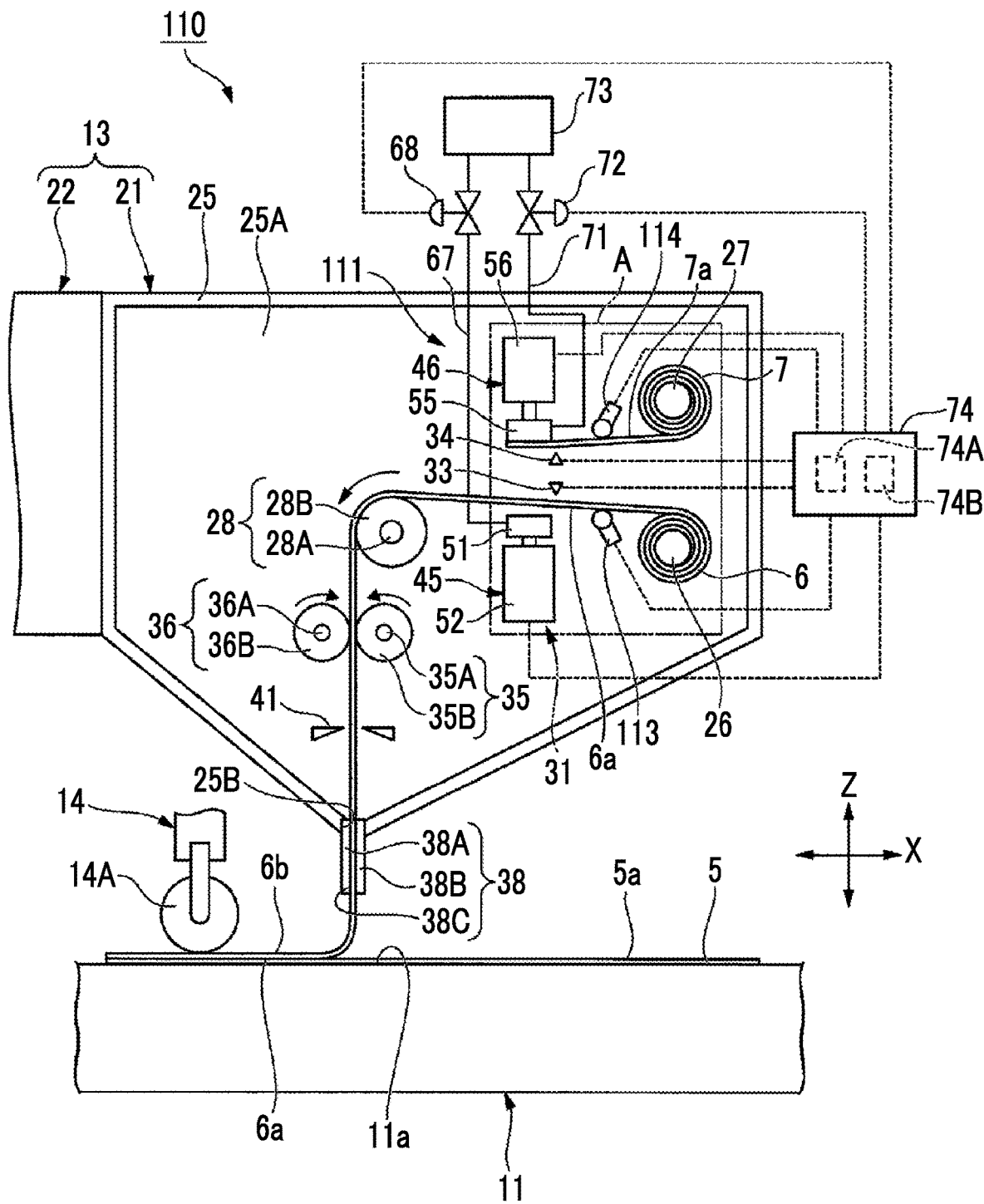
FIG. 10 is a side view illustrating a composite material automated lamination device according to a fifth embodiment of the present invention.

A composite material automated lamination device 110 of the fifth embodiment will be described with reference to FIG. 10. In FIG. 10, the same components as those of the structure illustrated in FIG. 9 are designated by the same reference numerals.

The composite material automated lamination device 110 is configured similarly to the composite material automated lamination device 100 except for having a splice device 111 instead of the splice device 101 constituting the composite material automated lamination device 100 of the fourth embodiment.

The splice device 111 is configured similarly to the splice device 101 except for having a first roller encoder 113 and a second roller encoder 114 instead of the first and second distance detection units 104 and 105 constituting the splice device 101.

The first roller encoder 113 is provided between the first support rod 26 and the first suction plate 51 in the X direction. The first roller encoder 113 is disposed below the first composite material sheet 6 and abuts against the inner surface 6a of the first composite material sheet 6. The first roller encoder 113 is electrically connected to the control device 74.

The first roller encoder 113 detects, as the first information, a first length by which the first composite material sheet 6 wound around the first support rod 26 is delivered.

The first roller encoder 113 transmits the information about the first length to the control device 74.

The second roller encoder 114 is provided between the second support rod 27 and the second suction plate 55 in the X direction. The second roller encoder 114 is disposed above the second composite material sheet 7 and abuts against the inner surface 7a of the second composite material sheet 7. The second roller encoder 114 is electrically connected to the control device 74.

The second roller encoder 114 detects, as the second information, a second length by which the second composite material sheet 7 wound around the second support rod 27 is delivered.

The second roller encoder 114 transmits the information about the second length to the control device 74.

The storage unit 74A of the control device 74 stores a first predetermined length and a second predetermined length that have been input in advance. The first predetermined length is a length that serves as a reference for determining that the residual amount of the first composite material sheet 6 is low. The second predetermined length is a length that serves as a reference for determining that the residual amount of the second composite material sheet 7 is low.

The information about the first length is transmitted from the first roller encoder 113 to the determination control unit 74B of the control device 74. The determination control unit 74B determines that, when the first length reaches the first predetermined length stored in the storage unit 74A, the residual amount of the first composite material sheet 6 reaches the first residual amount (small residual amount). After that, the control device 74 performs the control for carrying out the processing described in the first embodiment (the supply and stop processing of the first composite material sheet 6, the cutting processing of the first composite material sheet 6, the pressure-bonding processing, and the like).

Additionally, information about the second length is transmitted from the second roller encoder 114 to the determination control unit 74B of the control device 74. The determination control unit 74B determines that the residual amount of the second composite material sheet 7 reaches the second residual amount (small residual amount) when the second length reaches the second predetermined length stored in the storage unit 74A. After that, the control device 74 performs the control for carrying out the processing described in the first embodiment (the supply and stop processing of the second composite material sheet 7, the cutting processing of the second composite material sheet 7, the pressure-bonding processing, and the like).

According to the splice device 101 of the fifth embodiment, the first and second distance detection units 104 and 105 are provided instead of the first and second weight scales 61 and 62 described in the first embodiment. Accordingly, the splice work of pressure-bonding the composite material sheets (the first composite material sheet 6 and the second composite material sheet 7) can be automatically performed.

In addition, the first and second heater units 81 and 82 described in the second embodiment and the first and second vibrating units 91 and 92 described in the third embodiment may be appropriately combined and used for the splice device 111 of the fifth embodiment.

Although the preferred embodiments of the present invention have been described in detail above, the present invention is not limited to such specific embodiments, and various modifications and changes can be made within the spirit of the present invention described within the claims.

For example, in the first to fifth embodiments, a case including a configuration in which the first composite material sheet 6 and the unused second composite material sheet 7 are pressure-bonded when the residual amount of the first composite material sheet 6 reaches the first residual amount and a configuration in which the second composite material sheet 7 and the unused first composite material sheet 6 are pressure-bonded when the residual amount of the second composite material sheet 7 reaches the second residual amount has been described as an example. However, only one configuration of these two configurations may be provided.

Additionally, in the first to fifth embodiments, as an example, a case where only one suction plate of the first and second suction plates 51 and 55 is raised and lowered and pressure-bonded has been described. However, both the first and second suction plates 51 and 55 may be raised and lowered to perform the pressure-bonding processing.

INDUSTRIAL APPLICABILITY

The present invention is applicable to the splice device and the composite material automated lamination device.

REFERENCE SIGNS LIST

5 Composite material sheet
5a Upper surface
6 First composite material sheet
6a, 7a Inner surface
6A Rear end portion
6b, 7b Outer surface
7 Second composite material sheet
7A Tip portion
10, 100, 110 Composite material automated lamination device
11 Lamination stage
11a Upper surface
13 Laminating robot
14 Compaction roller
14A, 28B, 35B, 36B Roller body
16, 80, 90, 101, 111 Splice device
21 Composite material supply unit
22 Robot arm
25 Housing
25A Accommodation space
25B Groove portion
26 First support rod
27 Second support rod
28 Support roller
28A, 35A, 36A Shank
31 Pressure-bonding mechanism
33 First cutting part
34 Second cutting part
35, 36 Supply roller
38 Guide unit
38A First plate portion
38B Second plate portion
38C Groove
41 Third cutting part
45 First pressure-bonding mechanism
46 Second pressure-bonding mechanism
51 First suction plate
51a First suction surface
51A, 55A Suction hole
51B, 55B Suction path
52 First elevating part
55 Second suction plate
55a Second suction surface
56 Second elevating part
61 First weight scale
62 Second weight scale
67 First line
68 First electromagnetic valve
71 Second line
72 Second electromagnetic valve
73 Vacuum source
74 Control device
74A Storage unit
74B Determination control unit
81 First heater unit
82 Second heater unit
84, 85 Electric wire
88 Power supply
91 First vibrating unit
92 Second vibrating unit
104 First distance detection unit
104a First detection surface
105 Second distance detection unit
105a Second detection surface
113 First roller encoder
114 Second roller encoder

The invention claimed is:

1. A splice device comprising:
a first support rod around which a first prepreg sheet is wound;
a second support rod around which a second prepreg sheet having the same configuration as that of the first prepreg sheet is wound;
a first detection unit that detects first information necessary for acquiring a residual amount of the first prepreg sheet wound around the first support rod;
a second detection unit that detects second information required for acquiring a residual amount of the second prepreg sheet wound around the second support rod;
a first cutting part that separates a rear end portion of the first prepreg sheet from the first support rod by cutting the first prepreg sheet in a width direction;
a second cutting part that separates a rear end portion of the second prepreg sheet from the second support rod by cutting the second prepreg sheet in the width direction;
a pressure-bonding mechanism that is disposed on a downstream side of the first and second cutting parts, pressure-bonds the rear end portion of the first prepreg sheet and a tip portion of the second prepreg sheet after the first prepreg sheet is cut in the width direction, and pressure-bonds the rear end portion of the second prepreg sheet and a tip portion of the first prepreg sheet after the second prepreg sheet is cut in the width direction; and
a control device that controls the first cutting part, the second cutting part, and the pressure-bonding mechanism,
wherein the control device acquires the residual amount of the first prepreg sheet on the basis of the first information, causes the first cutting part to cut the first prepreg sheet when the residual amount of the first prepreg sheet reaches a preset first residual amount, then causes the pressure-bonding mechanism to pressure-bond the rear end portion of the first prepreg sheet and the tip portion of the second prepreg sheet, acquires the residual amount of the second prepreg sheet on the basis of the second information, causes the second cutting part to cut the second prepreg sheet when the residual amount of the second prepreg sheet reaches a preset second residual amount, and then causes the pressure-bonding mechanism to pressure-bond the rear end portion of the second prepreg sheet and the tip portion of the first prepreg sheet, and wherein the pressure-bonding mechanism includes:
a first suction plate including a first suction surface that suctions an inner surface of the rear end portion of the first prepreg sheet or an inner surface of the tip portion of the first-prepreg sheet,
a second suction plate including a second suction surface that suctions an inner surface of the tip portion of the second prepreg sheet or an inner surface of the rear end portion of the second prepreg sheet, the first suction surface and the second suction surface being arranged to face each other in a vertical direction, and
an elevating part that pressure-bonds the first prepreg sheet and the second prepreg sheet with the first and second suction plates in a state in which the first suction surface and the second suction surface are made to face each other by raising and lowering at least one of the first and second suction plates.

2. The splice device according to claim 1, wherein the pressure-bonding mechanism includes a first heater unit that heats the first suction plate, and a second heater unit that heats the second suction plate.

3. The splice device according to claim 2, wherein the pressure-bonding mechanism has a vibrating unit that vibrates at least one of the first suction plate and the second suction plate.

4. The splice device according to claim 1, wherein the first detection unit is a first weight scale that is disposed so as to support a portion of the first support rod located outside a region around which the first prepreg sheet is wound from below and detects a first total weight of a remaining first prepreg sheet wound around the first support rod and the first support rod as the first information,
the second detection unit is a second weight scale that is disposed so as to support a portion of the second support rod located outside a region around which the second prepreg sheet is wound from below and detects a second total weight of a remaining second prepreg sheet wound around the second support rod and the second support rod as the second information, and
the control device determines that the residual amount of the first prepreg sheet reaches the first residual amount to cause the first cutting part to cut the first prepreg sheet when the first total weight reaches a first predetermined weight input in advance to the control device, and determines that the residual amount of the second prepreg sheet reaches the second residual amount to cause the second cutting part to cut the second prepreg sheet when the second total weight reaches a second predetermined weight input in advance to the control device.

5. The splice device according to claim 1, wherein the first support rod and the second support rod have a columnar shape,
the first detection unit is a first distance detection unit having a first detection surface that is disposed radially outside the first support rod so as to face an outer peripheral surface of the first prepreg sheet wound around the first support rod and detecting a first distance from the first detection surface to the outer peripheral surface of the first prepreg sheet as the first information on the basis of laser light emitted from the first detection surface toward the outer peripheral surface of the first prepreg sheet,
the second detection unit is a second distance detection unit having a second detection surface that is disposed radially outside the second support rod so as to face an outer peripheral surface of the second prepreg sheet wound around the second support rod and detecting a second distance from the second detection surface to the outer peripheral surface of the second prepreg sheet as the second information on the basis of laser light emitted from the second detection surface toward the outer peripheral surface of the second prepreg sheet, and
the control device determines that the residual amount of the first prepreg sheet reaches the first residual amount to cause the first cutting part to cut the first prepreg sheet when the first distance reaches a first predetermined distance input in advance to the control device, and determine that the residual amount of the second prepreg sheet reaches the second residual amount to cause the second cutting part to cut the second prepreg sheet when the second distance reaches a second predetermined distance input in advance to the control device.

6. The splice device according to claim 1, wherein the first detection unit is a first roller encoder that detects a first length by which the first prepreg sheet wound around the first support rod is delivered,
the second detection unit is a second roller encoder that detects a second length by which the second prepreg sheet wound around the second support rod is delivered, and
the control device determines that the residual amount of the first prepreg sheet reaches the first residual amount to cause the first cutting part to cut the first prepreg sheet when the first length detected by the first roller encoder reaches a first predetermined length input in advance to the control device, and determines that the residual amount of the second prepreg sheet reaches the second residual amount to cause the second cutting part to cut the second prepreg sheet when the second length detected by the second roller encoder reaches a second predetermined length input in advance to the control device.

7. A composite material automated lamination device comprising:
the splice device according to claim 1;
a lamination stage;
a supply roller that feeds the first and second prepreg sheets onto a composite material sheet disposed on an upper surface of the lamination stage or an upper surface of the lamination stage;
a third cutting part that is provided on a downstream side of the supply roller and on an upstream side of the lamination stage and forms a prepreg sheet piece by cutting the first prepreg sheet or the second prepreg sheet in the width direction; and
a compaction roller that presses the prepreg sheet piece.

* * * * *